US012694149B2

(12) United States Patent
Kruegel et al.

(10) Patent No.: US 12,694,149 B2
(45) Date of Patent: Jul. 28, 2026

(54) SYSTEM AND METHOD FOR REDACTION OF DATA THAT IS INCIDENTALLY RECORDED

(71) Applicant: MOTOROLA SOLUTIONS, INC., Chicago, IL (US)

(72) Inventors: Chris A Kruegel, Plainfield, IL (US); Stefan Koprowski, Myslenice (PL); Stuart J Boutell, Edinburgh (GB); Grzegorz Gustof, Myslenice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 864 days.

(21) Appl. No.: 17/645,064

(22) Filed: Dec. 20, 2021

(65) Prior Publication Data

US 2023/0195927 A1    Jun. 22, 2023

(51) Int. Cl.
G06F 21/62 (2013.01)
G06Q 50/26 (2024.01)

(52) U.S. Cl.
CPC ....... G06F 21/6245 (2013.01); G06Q 50/265 (2013.01)

(58) Field of Classification Search
None
See application file for complete search history.

(56) References Cited

U.S. PATENT DOCUMENTS

| | | | |
|---|---|---|---|
| 10,631,139 B2 | 4/2020 | Proctor | |
| 10,783,261 B1 | 9/2020 | Gu et al. | |
| 10,839,104 B2 | 11/2020 | Balzer et al. | |
| 10,990,695 B2 | 4/2021 | Kvochko et al. | |
| 2016/0246996 A1* | 8/2016 | Khoo | G06F 16/00 |
| 2018/0314861 A1* | 11/2018 | Guzik | G06F 16/381 |
| 2019/0373210 A1 | 12/2019 | Nguyen et al. | |
| 2020/0411055 A1 | 12/2020 | Hershfield et al. | |
| 2021/0390844 A1* | 12/2021 | Katz | G08B 25/08 |

OTHER PUBLICATIONS

The International Search Report and the Written Opinion, corresponding patent application No. PCT/US2022/051927 filed: Dec. 6, 2022, mailed Apr. 3, 2023, all pages.

* cited by examiner

*Primary Examiner* — Ali S Abyaneh
*Assistant Examiner* — Felicia Farrow

(57) ABSTRACT

Techniques for redaction of data that is incidentally recorded. A request for information is received from a user. The requested information includes confidential information. The request is received via a first device. The requested information is sent to the first device for output to the user by the first device. A second device within proximity to the first device is determined. The second device causes the output from the first device to be recorded based on the proximity of the second device to the first device. The recording from the second device is marked as redactable. A portion of the recording from the second device that includes the confidential information is redacted when the recording from the second device is output.

20 Claims, 5 Drawing Sheets

<u>200</u>

300

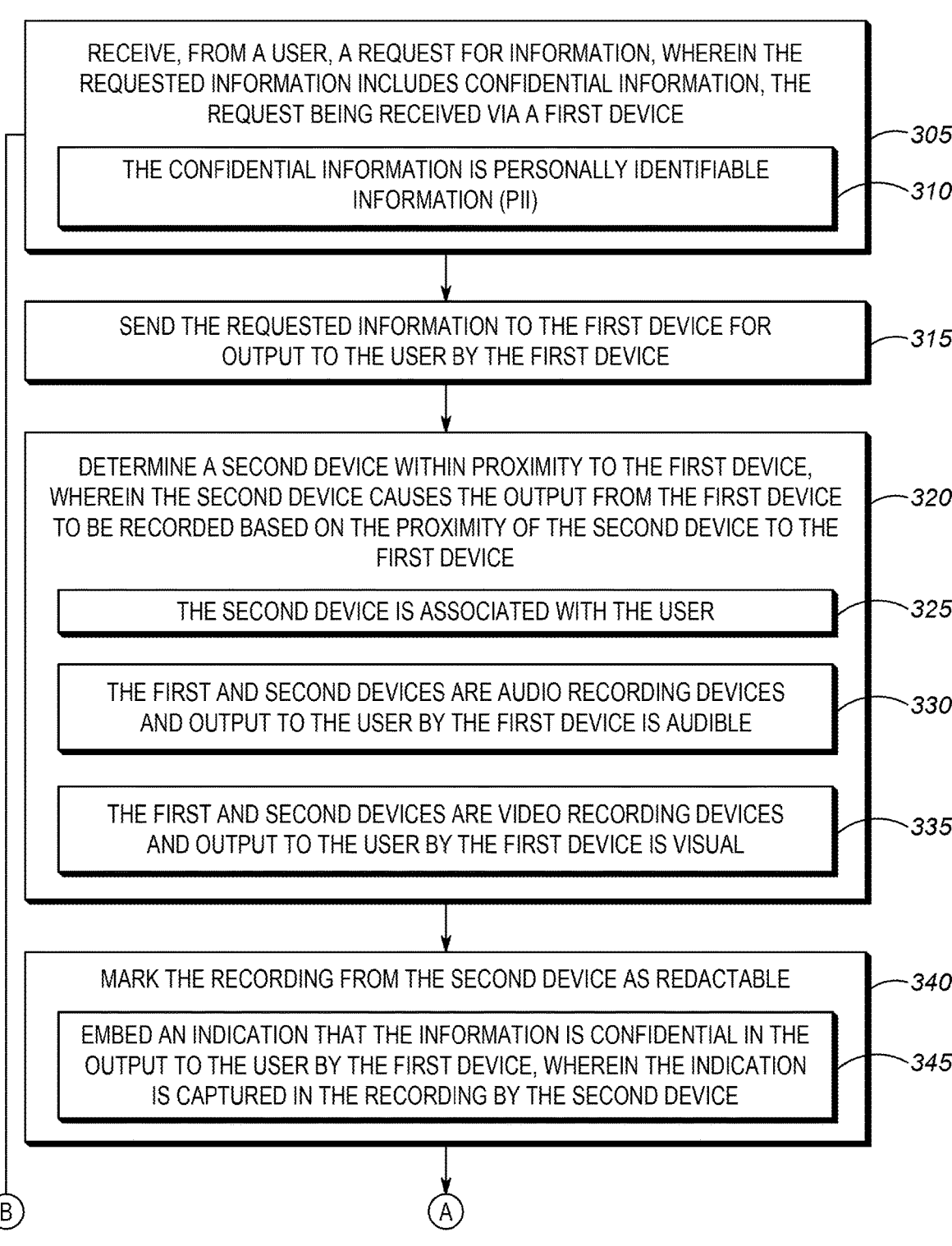

RECEIVE, FROM A USER, A REQUEST FOR INFORMATION, WHEREIN THE REQUESTED INFORMATION INCLUDES CONFIDENTIAL INFORMATION, THE REQUEST BEING RECEIVED VIA A FIRST DEVICE — 305

THE CONFIDENTIAL INFORMATION IS PERSONALLY IDENTIFIABLE INFORMATION (PII) — 310

SEND THE REQUESTED INFORMATION TO THE FIRST DEVICE FOR OUTPUT TO THE USER BY THE FIRST DEVICE — 315

DETERMINE A SECOND DEVICE WITHIN PROXIMITY TO THE FIRST DEVICE, WHEREIN THE SECOND DEVICE CAUSES THE OUTPUT FROM THE FIRST DEVICE TO BE RECORDED BASED ON THE PROXIMITY OF THE SECOND DEVICE TO THE FIRST DEVICE — 320

THE SECOND DEVICE IS ASSOCIATED WITH THE USER — 325

THE FIRST AND SECOND DEVICES ARE AUDIO RECORDING DEVICES AND OUTPUT TO THE USER BY THE FIRST DEVICE IS AUDIBLE — 330

THE FIRST AND SECOND DEVICES ARE VIDEO RECORDING DEVICES AND OUTPUT TO THE USER BY THE FIRST DEVICE IS VISUAL — 335

MARK THE RECORDING FROM THE SECOND DEVICE AS REDACTABLE — 340

EMBED AN INDICATION THAT THE INFORMATION IS CONFIDENTIAL IN THE OUTPUT TO THE USER BY THE FIRST DEVICE, WHEREIN THE INDICATION IS CAPTURED IN THE RECORDING BY THE SECOND DEVICE — 345

SYSTEM AND METHOD FOR REDACTION OF DATA THAT IS INCIDENTALLY RECORDED

BACKGROUND

Public safety first responders, such as police officers, have an ever increasing number of ways to obtain information while out in the field. Traditionally, police officers may have used a radio, such as a walkie talkie or vehicle mounted radio to request information from a human. For example, a police officer may use a radio to request that a human dispatcher look up information associated with a vehicle license plate or run a check for arrest warrants that have been issued for an individual. The dispatcher may query a database, retrieve the requested information, and provide that information to the requestor.

The reason the request may have traditionally been sent to a dispatcher is that access to the necessary databases may not have been available to the officer while he was in the field (e.g. no wired connection to the database available, etc.). With the ubiquitous nature of wireless data communications in current times, many police officers are now equipped with mobile terminals (e.g. mobile data terminals, laptop computers, smartphones, tablets, etc.) that can directly access the relevant databases. As such, instead of requesting the information from a human dispatcher, the police officer can use their own mobile terminal to directly access the database.

In a further improvement, the capabilities of digital assistants (e.g. Ski, Alexa, etc.) are ever increasing. A police officer may make a request for information over his radio to a digital assistant configured for public safety use. The digital assistant may receive and parse the request for information, access the appropriate database to retrieve the requested information, and then respond, via synthesized voice, with the requested information. Use of a digital assistant allows the user the convenience of making requests via speech with their radio. This may allow an officer to maintain situational awareness (e.g. eyes up, hands free) because they do not need to divert their attention to their mobile terminal. Furthermore, a digital assistant removes the need to have a human dispatcher available to hear and respond to the request for information.

In many cases, the communication channel over which the request for information is received and/or the information is provided is a shared communications channel. For example, in a police radio system, multiple officers may utilize the same communications channel, which may be referred to as a talkgroup. Anything communicated via the talkgroup may be heard by all members of the talkgroup. Such shared communications channels may be beneficial. For example, an arrest warrant check for a subject sent over a talkgroup to a dispatcher may result in a response that the subject is wanted for committing a violent felony and is to be considered dangerous. Because all other members of the talkgroup are able to hear this information, other officers in the talkgroup who heard the response, and are available, may travel to the location of the subject to provide aid to the querying officer, without having been directly requested to provide such aid.

Due to the nature of public safety responses to a request for service (e.g. crime, disasters, accidents, etc.) there is a need for the above type of communications to be preserved. In the case of audio communications, the communications may be recorded. Similarly, video communications (e.g. video calls, streaming video, etc.) may also be recorded. The same need exists to record multimedia communications (e.g.

text messages, file transfers, etc.) generally. In the case of direct access to a database by an officer's terminal, records of the access and information may be retrieved. Such recordings may be used at a later time (e.g. evidence in court, disclosure to the media/public, used in insurance claims, etc.).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

FIGS. 3A and 3B are another example of a flow diagram of the redaction of data that is incidentally recorded techniques described herein.

Figure 1:
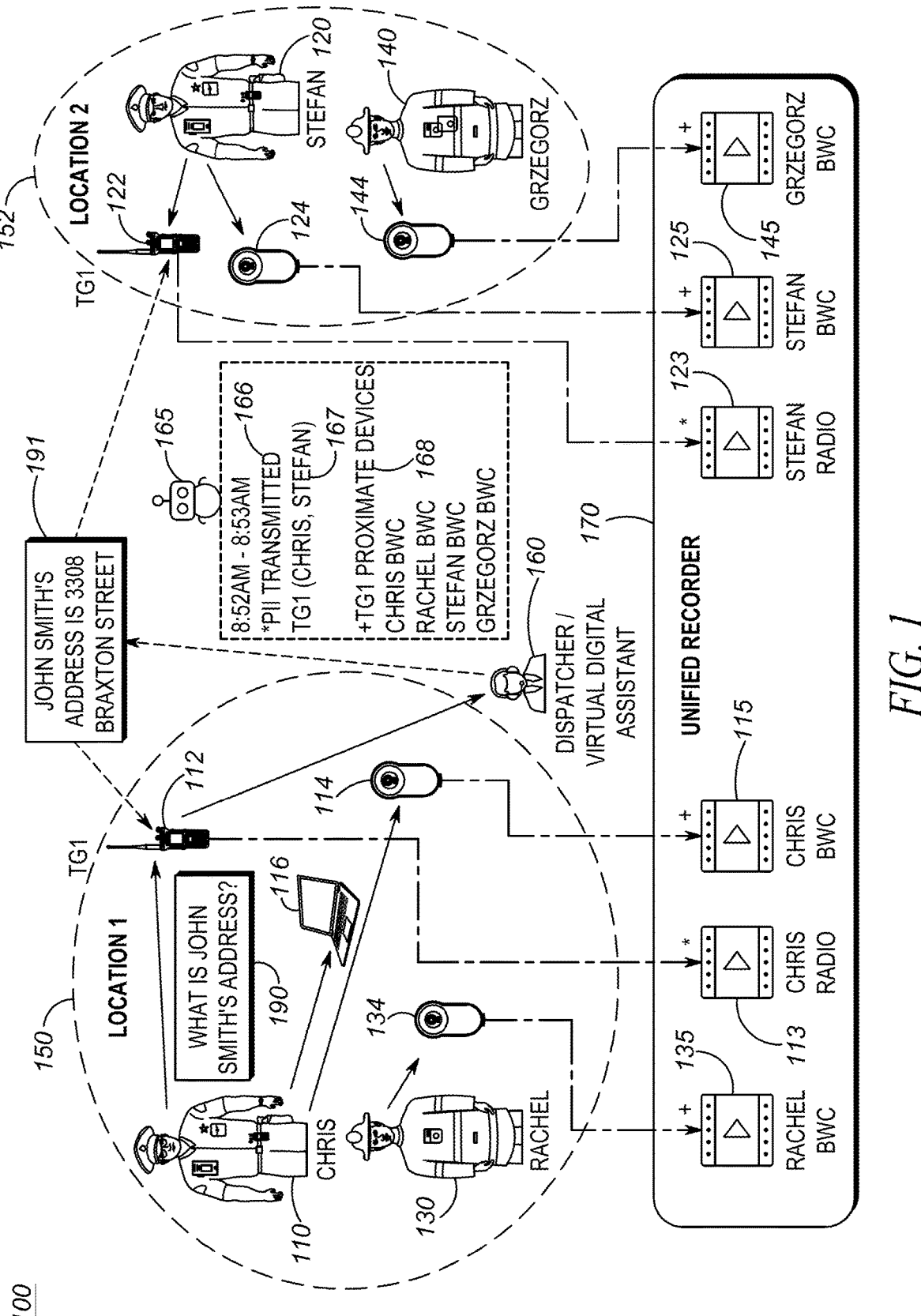
FIG. 1 is a diagram of an example environment that may implement the redaction of data that is incidentally recorded techniques described herein.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In many cases the recordings that were made need to be distributed to others. One common example is when the recordings cover events of interest to the public (e.g. mass shootings, etc.). There are often media requests for such recordings. Due to the nature of freedom of information requirements, public safety agencies may be compelled to release at least some of the recordings when requested.

In many cases the recordings may include confidential information that cannot or should not be shared. For example, the recording could include personally identifiable information (PII), such as addresses, social security numbers, driver's license numbers, license plate numbers, etc. In some cases, the recordings may include information that is legally protected. For example, the Health Insurance Privacy and Portability Act (HIPPA) in the United States limits who can receive private health information. In the case of a medical incident, requests for such information (e.g. patient medical history, etc.) may be sent via the communications channel, and thus recorded.

In order to satisfy these opposing requirements of disclosure and maintaining confidentiality, public safety agencies may release redacted versions of the recordings. For example, information determined to be confidential may be obscured from the recordings when released. In the case of an audio recording, the audio may be muted during portions where confidential information is spoken. For video recordings, the video may be redacted by blurring portions of the video that include confidential information.

Identifying the confidential information to be redacted from the recordings of the communications channel over which it was requested is relatively straight forward. When the request for information is received, the system can determine which data sources were used to gather information to provide a response. Within those data sources, the particular fields of information accessed may determine if a piece of information is confidential. For example, consider a request for information related to a person's driver's license, such as their home address. In some cases, the entire address in the database may be considered confidential, and as such, the entire response may need to be redacted. In other cases, only certain fields of the address may be considered confidential (e.g. street address is confidential while city and state are not). In those cases, only the portions considered confidential are redacted in the recording system.

In some cases, the entire data source may be confidential, such that any information that came from that data source is considered confidential. For example, a database including health information could be considered confidential. Any information retrieved from the health information database, regardless of what it is, would be considered confidential and thus redacted when necessary.

As mentioned above, the communications and/or response may go over a shared communications channel. Because it is understood that all responses are received by everyone in the talkgroup, and that the members of the talkgroup are known, the recordings from each talkgroup member can be similarly redacted.

A problem arises when a device that is not part of the talkgroup, that also records what is heard and/or seen, incidentally captures the confidential information as it is output from a device within the talkgroup. Public safety personnel often carry multiple devices that capture audio and/or video and that cause the captured audio and video to be recorded. For example, a police officer may carry a body worn camera (BWC) that captures his surrounding environment. The officer may use his radio to request confidential information (e.g. from a human dispatcher or digital assistant). The confidential information may then be played out over the speaker in the radio. However, because the BWC is recording the officer's surroundings (including audio) the confidential information would be captured in the BWC recording. Because the BWC is not within the radio talkgroup, the recording system would not know that the information captured is confidential and may need to be redacted if the BWC video is to be released.

As yet another example problem, the confidential information may be captured by a device that is in the vicinity of the device receiving the confidential information. For example, an emergency medical services (EMS) responder may be tending to a victim of a medical situation and sends a request for confidential patient information via their radio. The output, including the confidential patient information, is then played via the EMS responder's radio. However, there may be a police officer with a BWC nearby that is within audible distance of the EMS responder's radio and their BWC captures the confidential medical information. Again, since the BWC is not in the EMS radio talkgroup, the recording system would not necessarily know confidential information has been captured. If the police officer's BWC video is to be released, it may need to be redacted to obscure any possibly confidential information.

As yet another example problem, the information may be recorded by devices that are nowhere near the source of the request for the information. As explained above, in many cases, the responses are sent over a shared communications channel (e.g. talkgroup) with all members of the talkgroup hearing the information. A police officer may request confidential information. A non-involved officer, on the complete opposite end of town, who is in the same talkgroup as the requesting officer would hear the confidential information as it is played out over his radio. There may be a firefighter wearing a BWC that is within audio capture range of the non-involved officer's radio, and that BWC may capture the confidential information. Again, since the firefighter BWC is not part of the police officer talkgroup, the system would not know that confidential information, that could potentially require redaction, has been captured.

The techniques described herein solve these problems individually and collectively. A unified recording system stores all recordings from all devices. When it is determined that confidential information has been sent to one or more devices, all other devices that may have incidentally recorded the confidential information are determined. The recordings of those devices that may have incidentally recorded the confidential information are marked as potentially including confidential information.

A method is provided. The method includes receiving, from a user, a request for information, wherein the requested information includes confidential information, the request being received via a first device. The method also includes sending the requested information to the first device for output to the user by the first device. The method also includes determining a second device within proximity to the first device, wherein the second device causes the output from the first device to be recorded based on the proximity of the second device to the first device. The method also includes marking the recording from the second device as redactable. The method also includes redacting a portion of the recording from the second device that includes the confidential information when the recording from the second device is output.

In one aspect, the method further includes sending the requested information to a third device, the third device being part of a communications group including the first device, determining a fourth device within proximity to the third device, wherein the fourth device causes the output from the third device to be recorded based on the proximity of the fourth device to the third device, marking the recording from the fourth device as redactable, and redacting a portion of the recording from the fourth device that includes the confidential information when the recording from the fourth device is output.

In one aspect of the method the second device is associated with the user. In one aspect of the method the first and second devices are audio recording devices and output to the user by the first device is audible. In one aspect of the method the first and second devices are video recording devices and output to the user by the first device is visual.

In one aspect of the method, marking the recording from the second device as redactable further comprises embedding an indication that the information is confidential in the output to the user by the first device, wherein the indication is captured in the recording by the second device. In one aspect of the method the confidential information is personally identifiable information (PII).

A system is provided. The system includes a processor and a memory coupled to the processor. The memory includes a set of instructions thereon that when executed by the processor cause the processor to receive, from a user, a request for information, wherein the requested information includes confidential information, the request being received via a first device. The instructions also cause the processor to send the requested information to the first device for output to the user by the first device. The instructions also cause the processor to determine a second device within proximity to the first device, wherein the second device causes the output from the first device to be recorded based on the proximity of the second device to the first device. The instructions also cause the processor to mark the recording from the second device as redactable. The instructions also cause the processor to redact a portion of the recording from the second device that includes the confidential information when the recording from the second device is output.

In one aspect the system further comprises instructions that casue the processor to send the requested information to a third device, the third device being part of a communications group including the first device, determine a fourth device within proximity to the third device, wherein the fourth device causes the output from the third device to be recorded based on the proximity of the fourth device to the third device, mark the recording from the fourth device as redactable, and redact a portion of the recording from the fourth device that includes the confidential information when the recording from the fourth device is output.

In one aspect of the system the second device is associated with the user. In one aspect of the system the first and second devices are audio recording devices and output to the user by the first device is audible. In one aspect of the system the first and second devices are video recording devices and output to the user by the first device is visual.

In one aspect of the system the instructions to mark the recording from the second device as redactable further comprises instructions to embed an indication that the information is confidential in the output to the user by the first device, wherein the indication is captured in the recording by the second device. In one aspect of the system the confidential information is personally identifiable information (PII).

A non-transitory processor readable medium containing a set of instructions thereon is provided. The instructions that when executed by a processor cause the processor to receive, from a user, a request for information, wherein the requested information includes confidential information, the request being received via a first device. The instructions also cause the processor to send the requested information to the first device for output to the user by the first device. The instructions also cause the processor to determine a second device within proximity to the first device, wherein the second device causes the output from the first device to be recorded based on the proximity of the second device to the first device. The instructions also cause the processor to mark the recording from the second device as redactable. The instructions also cause the processor to redact a portion of the recording from the second device that includes the confidential information when the recording from the second device is output.

In one aspect the instructions on the medium further cause the processor to send the requested information to a third device, the third device being part of a communications group including the first device, determine a fourth device within proximity to the third device, wherein the fourth device causes the output from the third device to be recorded based on the proximity of the fourth device to the third device, mark the recording from the fourth device as redactable, and redact a portion of the recording from the fourth device that includes the confidential information when the recording from the fourth device is output.

In one aspect of the medium the second device is associated with the user. In one aspect of the medium the first and second devices are audio recording devices and output to the user by the first device is audible. In one aspect of the medium the first and second devices are video recording devices and output to the user by the first device is visual.

In one aspect of the medium the instructions to mark the recording from the second device as redactable further comprises instructions to embed an indication that the information is confidential in the output to the user by the first device, wherein the indication is captured in the recording by the second device.

Further advantages and features consistent with this disclosure will be set forth in the following detailed description, with reference to the figures.

FIG. 1 is a diagram of an example environment 100 that may implement the redaction of data that is incidentally recorded techniques described herein. Environment 100 may include a first public safety responder named Chris 110. For example, Chris may be a police officer that is responding to an incident scene. Chris may carry several devices that allow communication as well as capturing of Chris's surroundings.

For example, Chris 110 may carry a radio 112 which allows for wireless communications with others. Radio 112 is depicted as a portable radio (e.g. a walkie talkie) however it should be understood that the radio may also be vehicle mounted. What should be understood is that the radio 112 allows wireless communication with remote entities. The radio may be used to request and receive information. Communications with the radio 112 may be organized via a talkgroup. A talkgroup is a group of radio communications devices that communicate over a communications channel. In many cases, the communications channel may be a half-duplex communications channel, meaning that only one member of the talkgroup may communicate (e.g. speak) at any one time. For purposes of this description, assume radio 112 is a member of talkgroup 1 (TG1). In general, any communications over a talkgroup is received and heard by all members of the talkgroup, as will be explained in more detail below.

Such radio systems may be referred to as Push-to-Talk (PTT) systems. Example radio systems may include Land Mobile Radio (LMR) systems compliant with the Project 25 (P25) specification put out by the Association of Public Safety Communications Officials (APCO) or the Terrestrial Trunked Radio (TETRA) specification put out by the European Telecommunications Standards Institute (ETSI). In some cases, the PTT functionality may be provided as an application running on a device such as a smartphone in accordance with the Mission Critical PTT (MC-PTT) specification put out by the $3^{rd}$ Generation Partnership Project (3GPP). It should be understood that the list of radio technologies is intended to be exemplary, and not exhaustive. What should be understood is that radio 112 could be any communications technology that allows communications with remote participants.

Chris 110 may also carry a device such as a Body Worn Camera (BWC) 114. A BWC may be a device that captures audio and video of the area surrounding the device. For example, an officer may wear a BWC positioned such that it is pointed in the general direction of the wearer's eyes, and as such captures whatever the wearer is looking at. The BWC may include a microphone that captures sounds in the vicinity of the wearer, capturing whatever the wearer is likely to have heard. Although a BWC 114 is described, it should be understood that this is not intended to imply any particular form factor. For example, the functionality of recording surrounding audio and video could be performed by a chest mounted camera, a shoulder mounted camera, augmented reality glasses, an in vehicle dashboard camera, or any other type of video recording technology. What should be understood is the BWC 114 is intended to describe any video recording technology that is capable of recording the audio and video that is in Chris's 110 surroundings.

In some cases, a camera may not be directly associated with a public safety responder. For example, a surveillance camera (not shown) may record audio and video of Chris's surroundings. Smart cities may include cameras that broadly record anything that occurs within their area of coverage. For purposes of the remainder of this description, a BWC will refer to any device that records audio and video of a person's surroundings, regardless of if the camera is physically associated (e.g. worn, etc.) by the person. For ease of description, for the remainder of this description it should be assumed that captured video includes the associated audio.

Chris 110 may also carry a mobile terminal 116. A mobile terminal may be any type of computing device (e.g. mobile data terminal, laptop computer, tablet, smartphone, etc.) that allows the device owner to send queries to remote databases and receive responses to those queries. Mobile terminals will typically connect to a wireless data network (e.g. Long Term Evolution (LTE), 5$^{th}$ Generation (5G), etc.) to provide data communication.

It should be noted that in some cases, all of the devices carried by Chris 110 may form a personal area network (PAN) to allow the devices to communicate with one another and use resources of each device. For example, radio 112 may include a LTE modem that allows communication with an LTE data network. Mobile terminal 116 may connect to radio 112 via the PAN in order to utilize the LTE data network.

As mentioned above, in a public safety context, all communications may need to be recorded. Unified recorder 170 may be a system that receives and stores the recorded communications, and provides additional functionality that will be described in further detail below. In some cases, the unified recorder may receive the communications from the infrastructure supporting the device. For example, in the case of radio 112, the radio network infrastructure may provide the communications that occur on the talkgroup for each radio to the unified recorder. This means that the radio 112 itself need not record the communications, as the recording is done from the infrastructure. Because the radio infrastructure supports all devices on the talkgroup, it should be understood that there need not be separate recordings for each radio, as the recordings from each radio would be identical. For purposes of ease of description, the remainder of this disclosure will assume that each device on the talkgroup is recorded individually, however it should be understood that the infrastructure may actually only supply a single recording of the talkgroup to avoid duplicate recordings.

In other cases, the device itself may send the communications to the unified recorder 170. For example, BWC 114 may include the ability to stream video to a remote location (e.g. includes its own data network connection, utilizes capabilities provided by the PAN, etc.). The BWC 114 may then stream the captured video to the unified recorder 170. As such, the BWC need not locally record the captured video. Although streaming the video to the unified recorder eliminates the need to store the recordings on the device itself, this comes at the cost of usage of limited wireless bandwidth.

In some implementations, the BWC 114 may record the captured video on the device itself and upload to the unified recorder 170 at a later time. For example, at the end of an officer's shift, they may directly connect their BWC 114 to the unified recorder 170 via a high speed connection (e.g. wired connection, short range wireless connection (e.g. WiFi, Bluetooth, etc.)) and upload the recording from the device itself. Regardless of how the recording gets into the unified recorder 170, what should be understood is that the captured communication and/or video from the devices such as the radio 112 or BWC 114 are recorded by the unified recorder.

Environment 100 may also include another public safety first responder Stefan 120. Stefan 120 may be, for example, a police officer. Stefan 120, just as Chris 110 may carry a radio 122. Radio 122 may be similar to radio 112 and the description of radio 112 is equally applicable to radio 122. Furthermore, for purposes of this description, assume that radio 122 is also in talkgroup 1 (TG1). As explained above, this means that any communication on TG1 will be heard by Chris 110, Stefan 120, and the owner of any other device that is included in TG1. Stefan 120 may also be equipped with BWC 124, which is similar to BWC 114. For ease of description, the details of BWC 114 will not be repeated with respect to BWC 124.

Environment 100 may also include first responder Rachel 130. For example, first responder Rachel 130 may be a firefighter responding to an incident. First responder Rachel 130 may be equipped with a BWC 134 that is again similar to BWC 114, 124, and whose description will not be repeated. One thing that should be noted is that Rachel 130 in this example does not carry a radio that is included in TG1. This does not mean that Rachel is not carrying a radio, but rather that Rachel would not receive communications destined for TG1 (unlike Stefan 120 whose radio 122 is part of TG1).

Environment 100 may also include first responder Grzegorz 140. For example, first responder Grzegorz 140 may be an EMS technician. Just like Rachel 130, Grzegorz 140 may carry a BWC 144 whose description will not be repeated here but should be understood to be similar to the BWCs 114, 124, 134 that were previously described.

Assume that Chris 110 and Rachel 130 are both at location 1 150. For purposes of this description, being at a location means that all devices being carried can hear and/or see each other for purposes of recording. For example, as would be expected, any output from radio 112 could be captured by BWC 114 because both devices are being carried by Chris 110. Because Rachel 130 is in the same location as Chris 110, her BWC 134 would also be able to capture any output from radio 112. Such a situation can commonly occur when there are multiple responders from different services at an incident location. For example, at the scene of an auto accident it would not be unusual for there to be responders from police, fire, and medical services.

Assume Stefan 120 and Grzegorz 140 are both at location 2 152. Once again, this means that all devices within location 2 can hear and/or see each other for purposes of recording. Thus, any communication over TG1, which radio 122 is part of, could be captured by both BWC 124 and BWC 144.

Environment 100 may also include dispatcher/virtual digital assistant 160, which for ease of description will be referred to as a dispatcher. It should be understood that this is for ease of description only and that the dispatcher could either be a human or a digital assistant. The dispatcher 160 may receive requests for information (e.g. via radio 112, etc.), locate the information requested via a database lookup (not shown), and provide the response (e.g. via radio 112). In some cases, the information in the response is confidential information.

Environment 100 may also include bot 165. Bot 165 may be an automated program that monitors communication over a communications channel to determine if any confidential information 166 is being conveyed. If so, bot 165 may indicate that confidential information was sent over the communication channel to identified devices 167 and when that information was sent. Bot 165 may also determine other devices proximate 168 to the identified devices. Operation of bot 165 is described in further detail below.

In operation, Chris 110 may request information about a subject. As shown, Chris may use his radio 112 to ask the question, "What is John Smith's address?" 190. Because the radio 112 is part of TG1, Stefan's radio 122 will also output the question Chris asked, which in turn means that Stefan 120 now knows that someone on the talkgroup is asking for a person's address.

A dispatcher 160 may receive the question 190. For purposes of this description, the dispatcher is also part of TG1. The dispatcher may then look up the requested information in a database accessible to the dispatcher. For example, the dispatcher may have access to an ID database that can be used to look up state issued identification cards (e.g. driver's licenses, etc.). The particular question asked, database used, etc. is relatively unimportant. What should be understood is a dispatcher is asked a question and looks up data to respond. It should also be understood that it is relatively unimportant if the dispatcher is a human or a virtual digital assistant performing the query. The techniques described herein are independent of a human or virtual digital assistant being the recipient of the query.

The dispatcher 160 may retrieve the requested information from the database (not shown) and provide the information to the requestor, Chris 110. For example, the dispatcher may respond to Chris by saying, on TG1, "John Smith's address is 3308 Braxton Street."191. All devices on TG1 (e.g. radio 112, 122) would receive the response from the dispatcher and output the response audibly (e.g. via a speaker on the radio). As such, both Chris 110 and Stefan 120 would hear the response from the dispatcher.

Bot 165 may monitor the communications on TG1 to determine if any confidential information 166 has been sent. Bot 165 can determine if confidential information has been sent in many different ways. For example, the bot may determine that the database accessed to respond to the question 190 only includes confidential information, and as such any information provided from that database is per se confidential.

As another example, particular fields within a database may be marked as confidential and the bot 165 determines which fields within the database were used to prepare the response 191. For example, in a state issued identification card database, a person's city may not be considered confidential, while their street address might be considered confidential.

In yet another example, the bot 165 may use natural language processing to identify information that is confidential. For example, the bot may identify keywords such as address, which may have been associated with confidential information. As such, the reference to address could indicate that the information in the response is likely confidential information.

It should be understood that there are many techniques for determining if information is confidential and the techniques described herein may utilize any currently known or later developed technique to identify confidential information. What should be understood is that bot 165 is able to determine if the response, or portions of the response 191, includes confidential information. For purposes of this description, assume the entire response 191 is considered confidential information and was transmitted on TG1 between 8:52 AM and 8:53 AM 166. It should be understood that the period of transmission could be much more granular if only portions of the response 191 included confidential information (e.g. 15 seconds starting at 8:52:00 AM, 5 seconds starting at 8:52:30).

It should further be understood that although the current example is initiated by a request for information from Chris 110, the same techniques could be used for confidential information that is broadcast on the talkgroup by the dispatcher 160. For example the dispatcher may need to broadcast information to all talkgroup members (e.g. be on the lookout, all-points bulletin, etc.) and that information may include confidential information. The same techniques can be used to detect the presence of confidential information and marking the recordings for redaction.

If bot 165 has determined that confidential information, for example PII 166 has been sent, the bot may determine which devices were the known, intended recipients 167 of the information. In the present example, the dispatcher responded to the question 190 by sending the response 191 over TG1. Thus, any devices on that talkgroup would have output the confidential information. In this example, those devices 167 are Chris's radio 112 and Stefan's radio 122. What should be understood is that it is not a possibility that those devices received the confidential information, but is a given, since the information was specifically sent to those devices. As such, the recordings from those devices will include the confidential information. In this example, devices that definitely received the confidential information, and whose recordings would thus include the confidential information are marked with a "*" sign.

As shown in FIG. 1, the recordings 113 from Chris's radio and the recordings 123 from Stefan's radio are marked with a "*" sign, indicating that at the designated time period (e.g. 8:52 AM and 8:53 AM 166) there will be confidential information present in the recording that may need to be redacted when played out, depending on who is hearing the recording. The redaction/playback process is described in further detail below.

In addition to determining the devices that were the intended recipients 167 of the confidential information, the bot 165 may also determine other possible devices that received the confidential information due to their proximity to the intended devices. In the present example, Chris's BWC 114 is in the same location 150 as the radio 112 that was an intended recipient of the confidential information. As such, there is a possibility that the BWC 114 captured the confidential information when it was played out from the radio 112. For the devices that may have incidentally received the confidential information, the bot 165 cannot be positive that the recordings from those devices actually captured the confidential information. For example, the BWC 114 might not have been currently recording, the BWC might not have been in a position to clearly hear the output from radio 112, etc. What should be understood is that the recording from the devices that may have incidentally heard the confidential information do not necessarily actually include the confidential information.

Rachel's BWC 134 is similarly in the same location 150 as the radio 112. As such, her BWC 134 may have captured the confidential information as it was output from radio 112. Again, there is a possibility, not a certainty, that the confidential information is included in the recordings of proximate devices.

Stefan 120 may be in a location 2 152 that is completely different from location 1 150. Thus it is not possible for any of Stefan's devices to have captured the confidential information as output from radio 112. However, Stefan's own radio 122 is in the same talkgroup as radio 112. Thus when the confidential information was sent to the talkgroup, it would have been played out by all devices on the talkgroup, including radio 122.

Stefan's BWC 124 is in the same location as radio 122, and as such, there is a possibility that the recording from BWC 124 includes the confidential information. Likewise, Grzegorz 140 is in the same location 2 152 as Stefan's radio 122. As such, Grzegorz's BWC 144 may have potentially recorded the confidential information.

The bot 165 may identify all devices 168 that are proximate to devices in TG1 167. The techniques described herein are not dependent on any particular mechanism for determining proximity. In many cases, these types of devices (radios, BWCs, etc.) are equipped with global positioning system (GPS) capabilities and are able to determine and report their own location. In other cases, short range wireless techniques may be used to identify devices that are nearby. In yet other cases, the system may know which devices are assigned to which users and is able to track the locations where those users have been dispatched (thus determining which device would be in a given location).

In this example, the devices that are proximate 168 to the TG1 devices are indicated with an "+". As shown in FIG. 1, the recording 135 from Rachel's BWC, the recording 115 from Chris's BWC, the recording 125 from Stefan's BWC, and the recording 145 from Grzegorz's BWC are all marked with an "+" indicating that the recordings of those devices stored in the unified recorder 170 at the designated time stamp 166 may possibly contain information that may need to be redacted.

The examples presented thus far include when the request for potentially confidential information is requested via an audio channel (e.g. via a radio) and is output audibly (e.g. via a radio), which may then be captured by other devices. However, it should be understood that the techniques described herein are not so limited. As mentioned above, Chris 110 may also carry a mobile terminal 116 through which databases can be accessed directly. The bot 165 can also monitor access to confidential information from the mobile terminal 116 just as it did with the request for information from an audible source.

The requested information may then be displayed on the mobile terminal 116. For example, query 190 could have been entered via a keyboard on the mobile terminal and the response displayed on a screen of the mobile terminal. The mobile terminal itself will likely not have its output recorded, since there are other mechanisms for determining what databases were accessed (e.g. database log files). However, when Chris 110 is reading the mobile terminal screen, it is possible that BWC 114 records the screen where confidential information is displayed. Likewise, it is possible that if Rachel 130 is in close enough proximity to the mobile terminal 116, her BWC 134 may also capture the information displayed, although this may be less likely given the relatively short distance from which a display screen can be read.

Nonetheless, it should be understood that there is a possibility that either BWC 114 or BWC 134 recorded the mobile terminal 116 display screen while it was displaying confidential information, and as such the recordings from those devices may include confidential information that may later need to be redacted. As such, the recordings from those devices may be marked, as described above, as potentially including confidential information. It should also be noted that in this example, devices located in location 2 152 would have no ability to record the screen of mobile terminal 116, due to their being in a separate location.

As described above, the recordings from all the devices (e.g. radios 112, 122, BWCs 114, 124, 134, 144) may be stored (recordings 113, 115, 123, 125, 135, 145) in the unified recorder with an indication that they do include confidential information (e.g. recordings 113, 123) or may possibly include confidential information (e.g. recordings 115, 125, 135, 145). When it comes time to retrieve those recordings, it may be necessary to redact the recordings depending on who will be listening and/or viewing them.

In a simplistic mechanism, when the recording is stored in the unified recorder, those portions 166 of the recordings indicated as containing or potentially containing confidential information, could simply be erased, such that they are not available to anyone. Such a solution, although effective at preventing the playback of confidential information, may be unsuitable for use in a public safety environment. As an initial matter, the recordings may be considered evidence, and any deletion of such a recording could be considered tampering with evidence. Furthermore, there may be cases in which some parties (e.g. the court) should be allowed to see unaltered recordings whereas other parties (e.g. the media) may only be entitled to redacted recordings in order to protect confidential information.

In one technique, when played back, the portions of the recordings that are indicated as containing confidential information are muted/blanked during the time periods that the confidential information is being presented. The recordings are not altered permanently, but rather the playback system selectively blanks the portions of the recordings that do or may potentially include confidential information. Upon sufficient showing of a reason to access the unredacted version of the recording (e.g. court order, etc.) the playback system may then simply play the original recording.

As explained above, in the case where the recording comes from the device that was the intended recipient of the confidential information (e.g. radios 112, 122 in TG1) it can almost be certain that the recordings from those devices include the confidential information if so indicated by bot 165. However, in the cases of other devices that may have only incidentally recorded the confidential information, it is possible that the recording does not actually include any confidential information.

In one possible implementation of the playback system, an audio and/or video analytics system may be used to detect the presence of confidential information in the recording. If confidential information is detected, the output can be blanked during those portions. If not, the original recording can be played. In order to reduce the processing power required for the analytics, it may only be run on portions of the recording that have been determined to potentially contain information that should be redacted. It should be noted that this technique may not apply to recordings that are known to include confidential information (e.g. the recordings from the radios 112, 122.).

Figure 2:
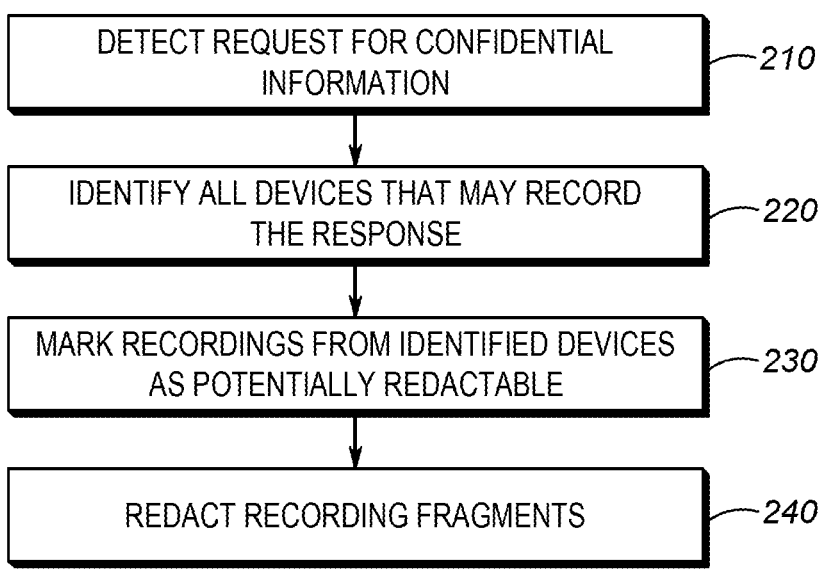
FIG. 2 is an example flow diagram of the redaction of data that is incidentally recorded techniques described herein.

FIG. 2 is an example flow diagram 200 of the redaction of data that is incidentally recorded techniques described herein. In block 210, a request for confidential information may be detected. As explained above, a bot 165 may monitor the data sources that are accessed in order to respond to a request for information to determine if any of those data sources include confidential information. If so, portions of the response that include the confidential information can be indicated.

In block 220, all devices that may record the response are identified. For example, the devices that are intended to receive the response (e.g. the device from which the request for information was made, etc.) can be indicated as a device that will record the response. In addition, devices that may record the response based on their proximity or known association to the devices which will receive the response, and may thus incidentally record the response are identified. Those devices are marked as having recordings that may potentially include confidential information.

As explained above, the devices may be identified as belonging to the same talkgroup as the device that requested the information, and all devices on that talkgroup are identified.

Once those devices on the talkgroup have been identified, the proximate devices can be identified. Identifying proximate devices can occur in many different ways. For example, all devices connected to the user's PAN could be considered proximate devices. Any recording devices in a vehicle that includes a device in the talkgroup could be included as a proximate device. People from different agencies who are in proximity to a device in the talkgroup may be considered as having devices they carry being in proximity to the device in the talkgroup. Additionally, devices that may capture the output from a device in the talkgroup (e.g. surveillance camera in a smart city whose coverage area includes a device in the talkgroup.).

In block 230, recordings from the identified devices may be marked as potentially redactable. A recording that is potentially redactable may include confidential information, and depending on the particular circumstances of the playback (e.g. who is playing back, where is it being played back), the confidential information may need to be redacted.

In block 240 recording fragments may be redacted. Those recordings that include potentially redactable information may have those fragments containing redactable information redacted when played back. In some cases, the redaction may occur in real time, as the recording is played back. In other cases, the information may be permanently redacted by deleting those fragments of the recording that include confidential information.

Figure 3B:
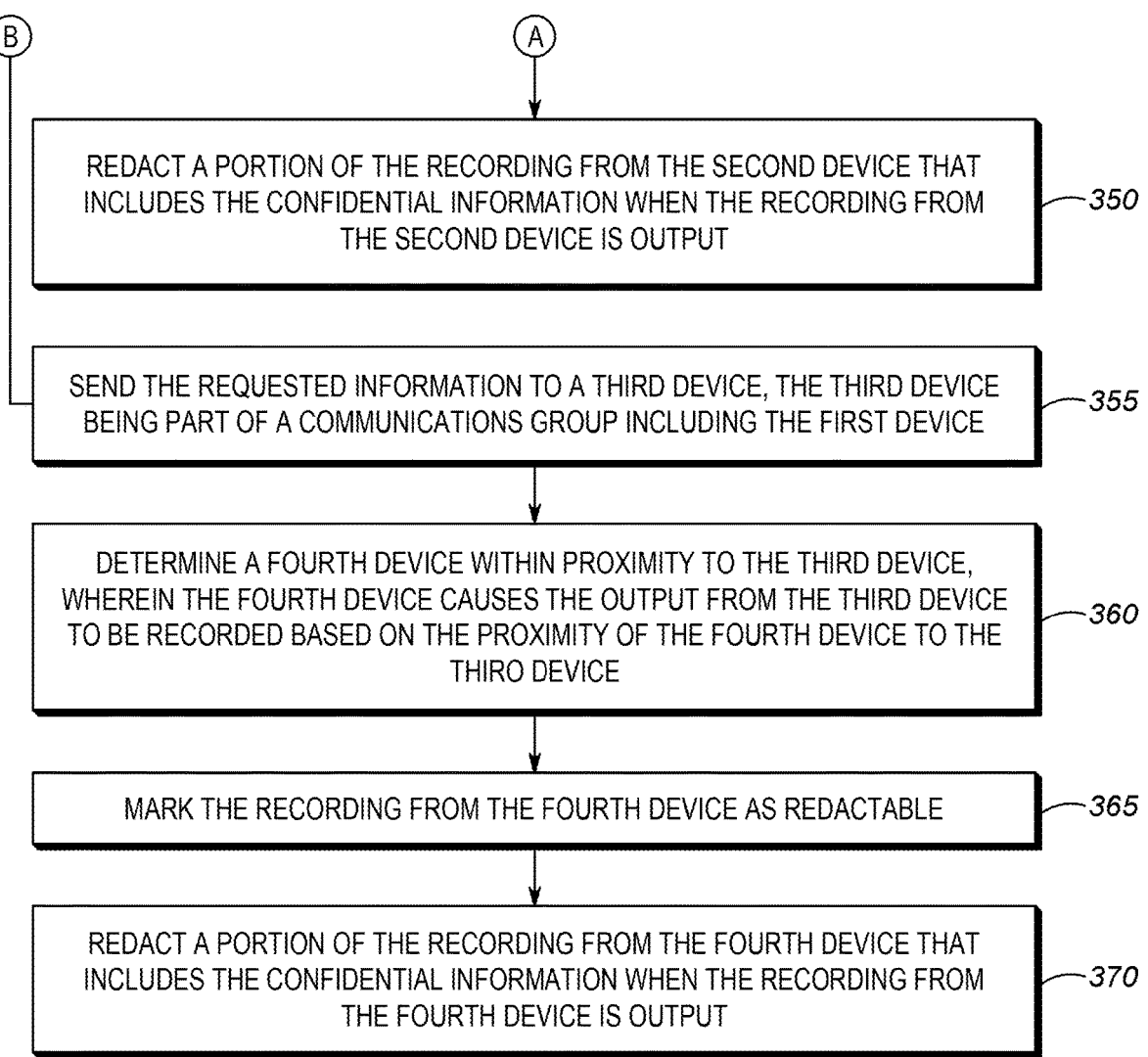

FIGS. 3A and 3B are another example of a flow diagram 300 of the redaction of data that is incidentally recorded techniques described herein. In block 305, a request for information may be received from a user. The requested information includes confidential information and the request is received from a first device. In the context of FIG. 1, the first device may be the radio 112 and the request for information may be the question 190 asked by Chris 110. Given that the request is for an address, and addresses may generally be considered confidential, the requested information, such as response 190, is going to include confidential information. In block 310, the confidential information is personally identifiable information (PII). There is information that may be confidential (e.g. the location of an undercover police operation, etc.) that does not specifically identify a person. A special category of confidential information may include PII, which is information that alone, or in combination with other information, may identify a specific individual. In some cases, there are laws that protect PII above and beyond the protection afforded to confidential information generally.

In block 315, the requested information is sent to the first device for output to the user by the first device. For example, in FIG. 1, the request for information 190 is sent from the first device, radio 112, and the response 191 is sent back to the radio 112 to be output by the radio in order for the user to hear the response.

In block 320, a second device within proximity to the first device is determined. The second device causes the output of the first device to be recorded based on the proximity of the second device to the first device. As explained above, there may be devices that are nearby the first device that is outputting the confidential information that may incidentally record the confidential information, based on the proximity. There is generally no way for such devices to avoid recording the confidential information, as they may not even know that they are causing confidential information to be recorded. Furthermore, as explained above the second device need not itself record the output, but may instead send the captured output from the first device to a recording device (e.g. streaming the captured output vs recording locally.).

In block 325, the second device is associated with the user. As explained above, the user that requested the confidential information may carry several devices. In some cases those devices may be connected via a PAN. A user may have a second device (e.g. BWC) that records the output from the first device (e.g. radio). However, it should be understood that the second device could be a device carried by a person other than the user, who happens to be in proximity to the first device.

In block 330, the first and second devices are audio devices and output to the user by the first device is audible. It should be understood that this is not intended to imply that an audio device only captures audio, but rather that it captures at least audio. For example, the output from a radio may be an audible output. A BWC, although capturing video, also captures audio. In block 335 the first and second devices are video recording devices and output to the user by the first device is visual. As explained above, a mobile terminal 116 may display the output on a screen to be viewed. A second device that is capable of recording video, such as a BWC, may capture the output as displayed on the mobile terminal.

In block 340 the recording from the second device is marked as redactable. This does not necessarily mean the recording of the second device does include confidential information, but rather that there is the possibility of confidential information being included in the recording. Several mechanisms for detecting confidential information were described above. In some implementations, the output from the first device may include an indication that the output includes redactable information.

In block 345, an indication that the information is confidential is embedded in the output to the user by the first device. The indication is captured in the recording of the second device. For example, when confidential information is being played out by the first device, a tone that is not audible to humans (but is recordable) may be output. This embedding may be used to indicate the recording of the second device includes confidential information. A similar mechanism could be applied to visual information. For example, an image, such as a digital watermark, could be included when confidential information is displayed. The second device, when recording such information, would know that the recording included confidential information.

In block 350, a portion of the recording from the second device that includes the confidential information may be redacted when the recording from the second device is output. As explained above, in some cases the redaction of the information is dependent on who is receiving the information. For those who are authorized to receive un-redacted information, the original recording may be output. For those not entitled to the original recording, portions including confidential information could be redacted by making those portions unintelligible during playback of the recording.

In block 355, the requested information may be sent to a third device, the third device being part of a communications group including the first device. As explained above all communications to a device on a talkgroup are received and output by all devices on that talkgroup. In this case, the first and third devices may be on the same talkgroup. Block 355 is very similar to block 315.

In block 360, just as in block 320, a fourth device within proximity to the third device is determined. The fourth device, just as the second device, causes the output from the third device to be recorded, based on the proximity of the fourth device to the third device.

In block 365, just as in block 340, the recording from the fourth device may be marked as redactable. In block 370, just as in block 350, a portion of the recording from the fourth device that includes the confidential information is redacted when the recording from the fourth device is output.

Figure 4:
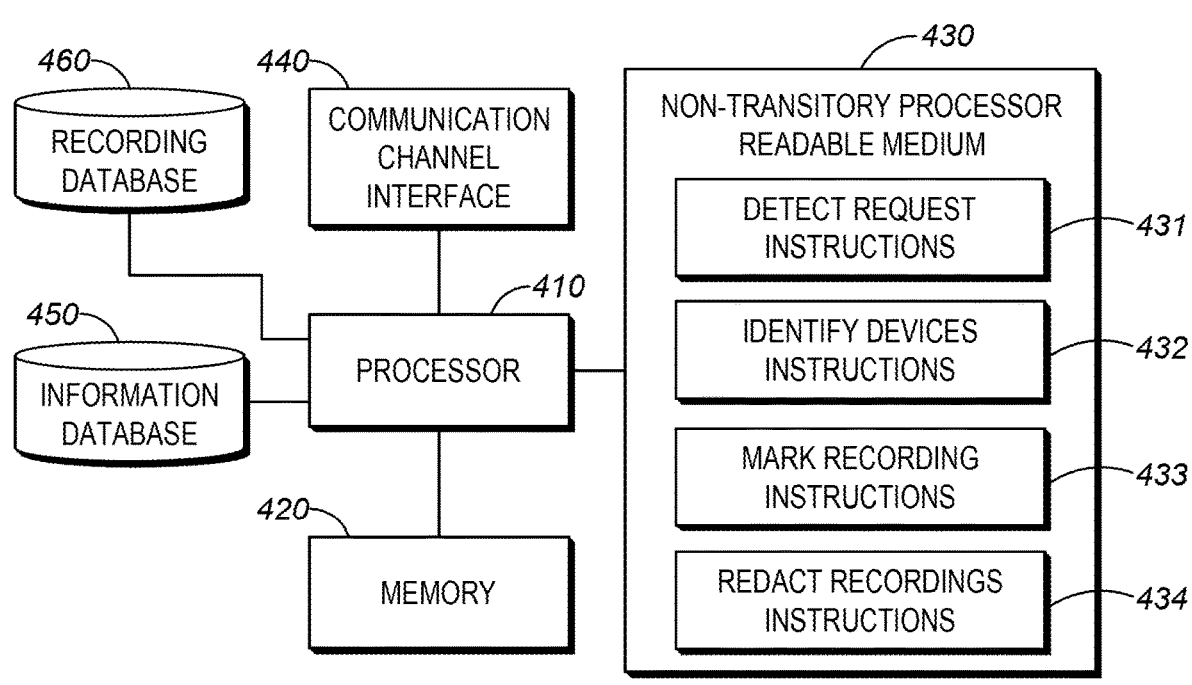
FIG. 4 is an example device that may implement the techniques described herein.

FIG. 4 is an example of a device 400 that may implement the redaction of data that is incidentally recorded techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. device proximity detection, marking as redactable, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, communication channel interface 440, information database 450, and recording database 460.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include detect request instructions 431. The detect request instructions 431 may cause the processor to receive communications from a first responder device via communications channel interface 440. For example, communications channel interface 440 may be an interface to a public safety radio system, etc. The request may be a request for information that may be stored in a database. The processor may then be used to access an information database 450 to gather the information necessary for providing a response to the request. The database query could be performed at the direction of a human dispatcher or a virtual digital assistant. The detect request instructions 431 are described throughout this description generally, including places such as the description of blocks 210, 305-315, and 355.

The medium 430 may include identify devices instructions 432. The identify devices instructions 432 may cause the processor to identify all devices that directly received the response to the request. The instructions may also cause the processor to identify all devices that may have incidentally captured the response to the request. The identify devices instructions 432 are described throughout this description generally, including places such as the description of blocks 220, 320-335, and 360.

The medium 430 may include mark recording instructions 433. The mark recording instructions 433 may cause the processor to mark recordings from the identified devices as redactable. For example, the recordings stored in recordings database 460 may be indicated as redactable if certain portions of the recordings may have captured information that is confidential. The mark recording instructions 433 are described throughout this description generally, including places such as the description of blocks 230, 340, 345 and 365.

The medium 430 may include redact recordings instructions 434. The redact recordings instructions 434 may cause the processor to redact the marked portions of the recordings. For example, when the recording is being played out, depending on who is accessing the recording, the marked portions may be redacted. The redact recordings instructions 434 are described throughout this description generally, including places such as the description of blocks 240, 350, and 370.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot identify devices located within proximity of other devices based on GPS or other positioning, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:

receiving, from a user, a request for information, wherein the requested information includes confidential information, the request being received via a first device;

sending the requested information to the first device for output to the user by the first device;

determining a second device within proximity to the first device, wherein the second device causes the output from the first device to be recorded based on the proximity of the second device to the first device;

marking the recording from the second device as redactable; and redacting a portion of the recording from the second device that includes the confidential information when the recording from the second device is output.

2. The method of claim 1 further comprising:

sending the requested information to a third device, the third device being part of a communications group including the first device;

determining a fourth device within proximity to the third device, wherein the fourth device causes the output from the third device to be recorded based on the proximity of the fourth device to the third device;

marking the recording from the fourth device as redactable; and redacting a portion of the recording from the fourth device that includes the confidential information when the recording from the fourth device is output.

3. The method of claim 1 wherein the second device is associated with the user.

4. The method of claim 1 wherein the first and second devices are audio recording devices and output to the user by the first device is audible.

5. The method of claim 1 wherein the first and second devices are video recording devices and output to the user by the first device is visual.

6. The method of claim 1 wherein marking the recording from the second device as redactable further comprises:

embedding an indication that the information is confidential in the output to the user by the first device, wherein the indication is captured in the recording by the second device.

7. The method of claim 1 wherein the confidential information is personally identifiable information (PII).

8. A system comprising:

a processor; and a memory coupled to the processor, the memory containing a set of instructions thereon that when executed by the processor cause the processor to:

receive, from a user, a request for information, wherein the requested information includes confidential information, the request being received via a first device;

send the requested information to the first device for output to the user by the first device;

determine a second device within proximity to the first device, wherein the second device causes the output from the first device to be recorded based on the proximity of the second device to the first device;

mark the recording from the second device as redactable; and redact a portion of the recording from the second device that includes the confidential information when the recording from the second device is output.

9. The system of claim 8 further comprising instructions to:

send the requested information to a third device, the third device being part of a communications group including the first device;

determine a fourth device within proximity to the third device, wherein the fourth device causes the output from the third device to be recorded based on the proximity of the fourth device to the third device;

mark the recording from the fourth device as redactable; and redact a portion of the recording from the fourth device that includes the confidential information when the recording from the fourth device is output.

10. The system of claim 8 wherein the second device is associated with the user.

11. The system of claim 8 wherein the first and second devices are audio recording devices and output to the user by the first device is audible.

12. The system of claim 8 wherein the first and second devices are video recording devices and output to the user by the first device is visual.

13. The system of claim 8 wherein the instructions to mark the recording from the second device as redactable further comprises instructions to:

embed an indication that the information is confidential in the output to the user by the first device, wherein the indication is captured in the recording by the second device.

14. The system of claim 8 wherein the confidential information is personally identifiable information (PII).

15. A non-transitory processor readable medium containing a set of instructions thereon that when executed by a processor cause the processor to:

receive, from a user, a request for information, wherein the requested information includes confidential information, the request being received via a first device;

send the requested information to the first device for output to the user by the first device;

determine a second device within proximity to the first device, wherein the second device causes the output from the first device to be recorded based on the proximity of the second device to the first device;

mark the recording from the second device as redactable; and redact a portion of the recording from the second device that includes the confidential information when the recording from the second device is output.

16. The medium of claim 15 further comprising instructions to:

send the requested information to a third device, the third device being part of a communications group including the first device;

determine a fourth device within proximity to the third device, wherein the fourth device causes the output from the third device to be recorded based on the proximity of the fourth device to the third device;

mark the recording from the fourth device as redactable; and redact a portion of the recording from the fourth device that includes the confidential information when the recording from the fourth device is output.

17. The medium of claim 15 wherein the second device is associated with the user.

18. The medium of claim 15 wherein the first and second devices are audio recording devices and output to the user by the first device is audible.

19. The medium of claim 15 wherein the first and second devices are video recording devices and output to the user by the first device is visual.

20. The medium of claim 15 wherein the instructions to mark the recording from the second device as redactable further comprises instructions to:

embed an indication that the information is confidential in the output to the user by the first device, wherein the indication is captured in the recording by the second device.

* * * * *